(12) United States Patent
Liu et al.

(10) Patent No.: US 11,782,881 B2
(45) Date of Patent: Oct. 10, 2023

(54) RECOMMENDING REMOTELY EXECUTED APPLICATIONS FOR OPENING FILES

(71) Applicant: VMware, Inc., Palo Alto, CA (US)

(72) Inventors: Steven Liu, Beijing (CN); Songli Li, Beijing (CN); Tong Zhao, Beijing (CN); Yanchao Zhang, Beijing (CN); Lin Lv, Beijing (CN); Mac Lu, Beijing (CN); Yue Zhao, Beijing (CN); Ken Song, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/317,366

(22) PCT Filed: Dec. 5, 2018

(86) PCT No.: PCT/CN2018/119322
§ 371 (c)(1),
(2) Date: Jan. 11, 2019

(65) Prior Publication Data
US 2021/0374100 A1 Dec. 2, 2021

(51) Int. Cl.
*G06F 16/178* (2019.01)
*G06F 16/176* (2019.01)
(Continued)

(52) U.S. Cl.
CPC ............ *G06F 16/178* (2019.01); *G06F 9/451* (2018.02); *G06F 9/543* (2013.01); *G06F 16/16* (2019.01);
(Continued)

(58) Field of Classification Search
CPC ... H04L 67/125; H04L 29/06; H04L 67/1095; H04L 63/029; H04L 67/06; G06F 16/183; G06F 16/1734; G06F 16/1787; G06F 3/1454; G06F 3/04812; G06F 3/0482; G06F 3/0484; G06F 3/0488; G06F 16/178;
(Continued)

(56) References Cited

U.S. PATENT DOCUMENTS 8,117,314 B2 * 2/2012 Croft .................. H04L 63/0428
709/227
8,595,182 B1 * 11/2013 Nelson ............... H04L 67/1095
707/602
(Continued)

FOREIGN PATENT DOCUMENTS

AU 2012295303 A1 * 1/2014 ......... G06F 3/04842
AU 2015200570 A1 * 2/2015 ......... G06F 3/04842
(Continued)

*Primary Examiner* — Steven P Sax
(74) *Attorney, Agent, or Firm* — Thomas | Horstemeyer, LLP

(57) ABSTRACT

Disclosed are various approaches for recommending remotely executed applications for opening files. In one approach, an indication is received that a user desires to open the local file of a client device remotely. At least one remotely executed application is identified to open the local file remotely. A user interface is rendered by the client device that facilitates selection from among the remotely executed application(s). A user selection of a particular remotely executed application generated through the user interface is received. The particular remotely executed application opens the local file remotely.

17 Claims, 7 Drawing Sheets

(51) Int. Cl.
  *G06F 9/54* (2006.01)
  *H04L 67/06* (2022.01)
  *G06F 16/16* (2019.01)
  *G06F 9/451* (2018.01)
  *G06F 11/34* (2006.01)
  *G06F 3/0486* (2013.01)
  *G06F 3/04817* (2022.01)
(52) U.S. Cl.
  CPC .......... *G06F 16/176* (2019.01); *H04L 67/06* (2013.01); *G06F 3/0486* (2013.01); *G06F 3/04817* (2013.01); *G06F 11/3438* (2013.01)
(58) Field of Classification Search
  CPC ........ G06F 16/176; G06F 9/543; G06F 67/06; G06F 16/16; G06F 9/451; G06F 11/3438; G06F 3/0486; G06F 3/04817
  See application file for complete search history.

(56) References Cited

U.S. PATENT DOCUMENTS

| | | | | |
|---|---|---|---|---|
| 9,400,801 B1* | 7/2016 | Aplemakh | ............ | G06F 16/183 |
| 9,946,722 B2* | 4/2018 | Clark | .................. | G06F 16/1734 |
| 10,110,512 B2* | 10/2018 | Pulier | ..................... | G06Q 10/06 |
| 10,320,926 B2* | 6/2019 | O'Doherty | ............. | G06F 9/451 |
| 10,924,528 B1* | 2/2021 | Korobov | ............. | G06F 16/1787 |
| 2004/0070608 A1* | 4/2004 | Saka | ........................ | H04L 29/06 |
| | | | | 715/748 |
| 2004/0073908 A1* | 4/2004 | Benejam | ............... | G06F 9/5083 |
| | | | | 718/105 |
| 2005/0114711 A1* | 5/2005 | Hesselink | ............. | H04L 63/029 |
| | | | | 726/4 |
| 2005/0149481 A1* | 7/2005 | Hesselink | ............. | H04L 67/125 |
| 2007/0076230 A1* | 4/2007 | Li | ........................ | G06F 3/1454 |
| | | | | 358/1.2 |
| 2007/0097150 A1* | 5/2007 | Ivashin | ................. | G06F 3/0485 |
| | | | | 345/660 |
| 2008/0288301 A1* | 11/2008 | Emling | ................. | G06F 16/168 |
| | | | | 705/4 |
| 2009/0019383 A1* | 1/2009 | Riley | ..................... | G06Q 10/10 |
| | | | | 715/764 |
| 2009/0064284 A1* | 3/2009 | Poston | ................. | G06F 21/6218 |
| | | | | 726/4 |
| 2009/0327905 A1* | 12/2009 | Mascarenhas | .......... | H04L 67/36 |
| | | | | 715/738 |
| 2010/0132023 A1* | 5/2010 | Reese | ..................... | G06F 40/14 |
| | | | | 709/217 |
| 2010/0317420 A1* | 12/2010 | Hoffberg | ............ | G06Q 30/0282 |
| | | | | 463/1 |
| 2011/0099497 A1* | 4/2011 | Fok | .......................... | H04W 4/60 |
| | | | | 715/769 |
| 2012/0185520 A1* | 7/2012 | Iarocci | ..................... | H04L 67/51 |
| | | | | 707/827 |
| 2013/0073600 A1* | 3/2013 | Jenkins | ................. | G06F 9/5027 |
| | | | | 709/201 |
| 2014/0047349 A1* | 2/2014 | Kulkarni | ............... | G06F 3/0486 |
| | | | | 715/739 |
| 2014/0082537 A1* | 3/2014 | Mitsunaga | ............ | G06F 3/0486 |
| | | | | 715/769 |
| 2015/0128158 A1* | 5/2015 | Wheatley | ......... | H04N 21/42221 |
| | | | | 725/12 |
| 2016/0156957 A1* | 6/2016 | Yun | ................... | H04N 21/44204 |
| | | | | 725/14 |
| 2016/0360336 A1* | 12/2016 | Gross | ................ | H04M 1/72403 |
| 2018/0035606 A1* | 2/2018 | Burdoucci | ....... | H04N 5/232935 |
| 2018/0143866 A1* | 5/2018 | Das | ....................... | G06F 9/5077 |
| 2018/0359305 A1* | 12/2018 | Dingwell | ................ | G06F 9/54 |
| 2019/0325070 A1* | 10/2019 | Kovács | ................ | G06F 16/248 |
| 2019/0340554 A1* | 11/2019 | Dotan-Cohen | ............................ | |
| | | | | G06Q 10/063112 |

FOREIGN PATENT DOCUMENTS

| | | | | |
|---|---|---|---|---|
| CA | 2979622 A1 * | 3/2013 | ........... | G06F 9/5027 |
| EP | 2290939 A1 * | 3/2011 | ............. | G06Q 40/00 |
| WO | WO-02069139 A2 * | 9/2002 | ............... | G06F 8/34 |

* cited by examiner

RECOMMENDING REMOTELY EXECUTED APPLICATIONS FOR OPENING FILES

CROSS-REFERENCE TO RELATED APPLICATIONS

This application is the 35 U.S.C. § 371 national stage application of, and claims priority to, PCT Application No. PCT/CN2018/119322, filed Dec. 5, 2018, and entitled "RECOMMENDING REMOTELY EXECUTED APPLICATIONS FOR OPENING FILES," which is herein incorporated by reference in its entirety.

This application is related to U.S. Patent Application entitled "OPENING LOCAL FILES IN REMOTE APPLICATIONS," filed on Jan. 11, 2019 and assigned application Ser. No. 16/317,359, and U.S. Patent Application entitled "USING DRAG-AND-DROP TO OPEN LOCAL FILES REMOTELY," filed on Jan. 11, 2019 and assigned application Ser. No. 16/317,363.

BACKGROUND

Many organizations have deployed desktop virtualization in their information technology infrastructure. With desktop virtualization, users can interact with a remote desktop environment over a network. The applications in the remote desktop environment execute on a server, and the user's client simply renders graphical data sent by the server. The user's input relative to this graphical data, such as keystrokes, gestures, and cursor positioning, are returned by the client to the server. The client in such an environment becomes relatively insignificant, and system administration can be simplified through central maintenance of the desktop environment. In some cases, remote desktop sessions can be transferred among multiple clients and multiple types of clients, such as laptops, tablets, and smartphones.

Additionally, or alternatively, organizations can deploy remotely executed applications that are usable within a client desktop environment. In such situations, the application user interface is rendered by the server, rather than the desktop along with the application user interface. The remotely executed applications can function similarly to locally executed applications within the client desktop environment. As with the remote desktop, the server generates graphical data corresponding to the application user interface for rendering by the client, and the client returns input data relative to this graphical data. In some environments, users can work with potentially multiple remote desktop environments and potentially multiple remotely executed applications.

One difficulty in interacting with remote desktop environments and remotely executed applications relates to use of files locally stored on the client. Typically, a user would need to transfer the local file to a server hosting the remote desktop environment or remote application, open the remote application, use the remote application to open the copy of the file on the server, edit or modify the copy of the file, save the file, and then transfer the copy of the file back to the client. Performing these steps can be cumbersome and result in a diminished user experience as compared to interacting with local files using a locally executing application on the client. Potential problems can include the user forgetting where the copy of the file is stored on the server and selecting a particular application or remote desktop environment for opening the file where multiple choices are available.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for opening local files in remotely executed applications. Organizations are increasingly deploying applications and/or desktop environments for users to access remotely through client devices. However, opening local files on the client devices has involved multiple steps: initiating a session with a remotely executed application, manually copying a local file to a remote location, opening the file with the remotely executed application, saving the file with the remotely executed application, and then manually copying the modified file back to the client device. Also, the user might not know which remotely executed application is capable of opening the file, or which remote desktop environment has a remotely executed application that is capable of opening the file.

Examples of the present disclosure present approaches for opening local files automatically in remotely executed application. As will be described, a user of a client device can simply drag-and-drop an icon corresponding to the local file onto an icon corresponding to a remotely executed application, and the local file will be opened in the remotely executed application. In the background, a process initiates a session of the remotely executed application and automatically transfers a copy of the local file to a remote data store that is accessible to the remotely executed application. The remotely executed application is then configured to open the copy of the local file. The remotely executed application can then modify the copy of the local file. Upon modification, or when the session is complete, the modified copy of the local file can be transferred back to the client device automatically.

In another example, the user can drag-and-drop an icon corresponding to the local file onto an icon corresponding to a remote desktop environment or onto a blank region unassociated with a particular remote desktop environment. In such cases, one or more remotely executed applications can be recommended to the user either from the applications in the remote desktop environment or from any remotely executed applications available to the user. The recommendations can be populated based on the type of file in combination with the past behavior of the user, or if the past behavior of the user is insufficient, past behavior of other users. From this listing, the user can select a particular remotely executed application, and the local file is opened remotely in the selected remotely executed application.

Figure 1:
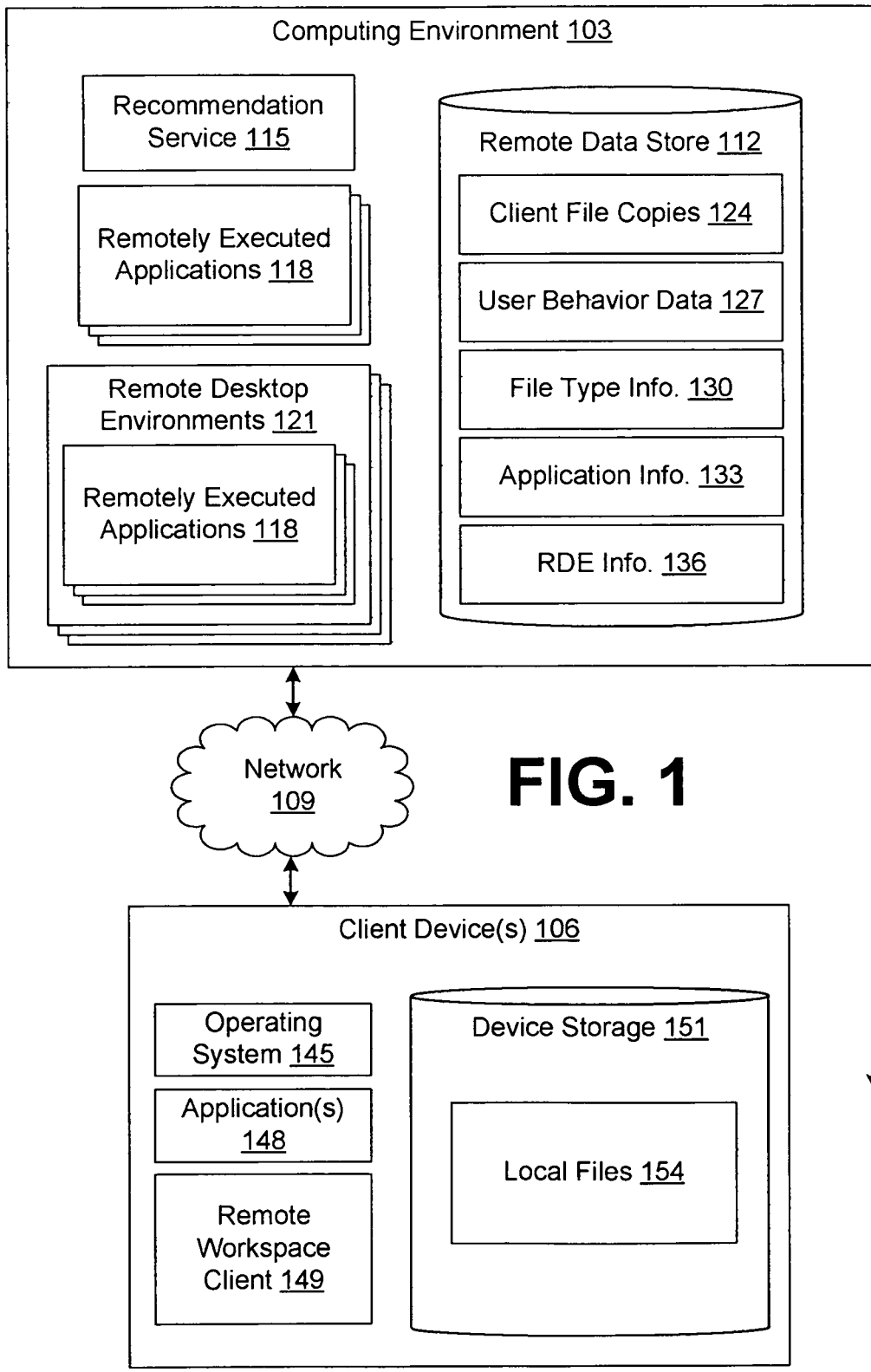
FIG. 1 is a drawing of a networked environment according to various examples of the disclosure.

With reference to FIG. 1, shown is a networked environment 100 according to various examples. The networked environment 100 includes a computing environment 103 and one or more client devices 106 in communication by way of network 109. The network 109 can include, for example, wide area networks (WANs), local area networks (LANs), wired networks, wireless networks, other suitable networks, or any combination of two or more networks. For example, the network 109 can include satellite networks, cable networks, Ethernet networks, and other types of networks.

The computing environment 103 can be a computing environment that is operated by an enterprise, such as a business or other organization. The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted computing environment. The computing environment 103 can be located remotely with respect to the client device 106.

Various applications and/or other functionality may be executed in the computing environment 103. The remote data store 112 can be representative of a plurality of data stores as can be appreciated. The remote data store 112 is described as being remote with respect to the client devices 106. The data stored in the remote data store 112, for example, is associated with the operation of the various applications and/or functional entities described below.

The components executed on the computing environment 103, for example, include a recommendation service 115, one or more remotely executed applications 118, one or more remote desktop environments 121 that each include one or more remotely executed applications 118, and other applications, services, processes, systems, engines, or functionality not discussed in detail herein. The recommendation service 115 is executed to generate recommendations for remotely executed applications 118 to open a particular file locally stored on a client device 106. The recommendations can be based on a file extension, file type, or the particular file itself, in combination with previous behavior of the user or other users in opening the file or other similar files.

The remotely executed applications 118 are computer programs that are executed remotely in the computing environment 103 rather than locally in the client device 106. To facilitate user interaction, a graphical user interface generated by a remotely executed application 118 can be encoded into data and sent over the network 109 to the client device 106 for rendering. For example, the graphical user interface can be encoded into a video stream or encoded into a series of rendering application programming interface (API) calls. Audio or other output generated by the remotely executed application 118 can also be streamed to the client device 106. Meanwhile, input from the user such as keystrokes, mouse cursor positioning, voice commands, and so forth, can be encoded into data and sent to the remotely executed applications 118 over the network 109.

The remotely executed applications 118 can be executed within a remote desktop environment 121. In a remote desktop environment 121, a user establishes a session with a desktop environment such as that provided by an operating system. The user then interacts with the desktop environment to launch applications, open files, and/or perform other functions. A graphical user interface generated by a remote desktop environment 121 can be encoded into data and sent over the network 109 to the client device 106 for rendering. For example, the graphical user interface can be encoded into a video stream or encoded into a series of rendering application programming interface (API) calls. Audio or other output generated by the remote desktop environment 121 can also be streamed to the client device 106. Meanwhile, input from the user such as keystrokes, mouse cursor positioning, voice commands, and so forth, can be encoded into data and sent to the remote desktop environment 121 over the network 109.

In some examples, one or more remotely executed applications 118 can be executed independently of a remote desktop environment 121. In such cases, a user need not establish a session with a remote desktop environment 121 in order to open a remotely executed application 118. Just the graphical user interface of the remotely executed application 118 can be rendered on the client device 106, rather than any surrounding desktop environment. Such operation can appear indistinguishable or nearly so from the operation of a locally executed application on the client device 106.

Although examples are given regarding graphical user interfaces of remotely executed applications 118, it is understood that remotely executed applications 118 need not include a graphical user interface. For example, a remotely executed application 118 can operate on a command-line basis or strictly through voice interactions.

The data stored in the remote data store 112 includes, for example, client file copies 124, user behavior data 127, file type information 130, application information 133, remote desktop environment (RDE) information 136, among other data. The client file copies 124 correspond to files that have been automatically transferred from the client device 106 to the remote data store 112 to be opened by a remotely executed application 118 or through a remote desktop environment 121. The client file copies 124 are maintained in the remote data store 112 to be accessible by the remotely executed application 118 that is to open the particular client file copies 124. In some cases, the client file copies 124 can be in a temporary storage such that they are automatically deleted after the remotely executed application 118 is closed or after the client file copies 124 are transferred back to the client device 106 after modification.

The user behavior data 127 records user behavior with respect to which files are opened by users using particular remote desktop environments 121 and/or particular remotely executed applications 118. It is noted that the user behavior data 127 can record the behavior in this regard of possibly a multitude of users, and the behavior of other users can inform recommendations for a particular user when insufficient behavior history is available for the particular user. The user behavior data 127 can index file opens based upon file extension, file type, file name, and/or other file information. The file opens can be associated with time information such as time of day, day of week, or seasonality. The file opens can also be associated with specific user information such as user identifier, client identifiers, organization role, and so forth.

The file type information 130 can record information about file types, such as word processing documents, spreadsheets, text files, image files, hypertext files, portable document format (PDF) files, and so forth. The file types can be associated with file extensions such as "txt," "docx," "png," "jpg," "html," and so on. The file extensions themselves can be mapped to particular applications, and more generically, the file types can be mapped to particular applications.

The application information 133 can include information regarding remotely executed applications 118 such as the types of files the remotely executed application 118 can open. In some cases, the application information 133 can record whether the remotely executed application 118 is to be considered a default application for a particular file type. The application information 133 can include manual configurations that map particular file types to particular remotely executed applications 118. The application information 133 can also include permissions information indicating which users have access to open particular remotely executed applications 118. The permissions information can also indicate which file types or specific files that the user should be granted permission to open with a given remotely executed application 118. The remote desktop environment information 136 can include information regarding remote desktop environments 121, such as which remotely executed applications 118 are available on particular remote desktop environments 121 and which users are to be granted access.

The client device 106 is representative of a plurality of client devices 106 that may be coupled to the network 109. The client device 106 can comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 106 has an operating system 145, such as WINDOWS, IOS, or ANDROID. The client device 106 can be configured to execute a plurality of different applications 148. The applications 148 can include web browsers, email applications, text message applications, video and voice communication applications, business productivity applications, file transfer applications, and so on. In addition, the client device 106 is configured to execute a remote workspace client 149, which provides access to the remotely executed applications 118 and the remote desktop environments 121 in the computing environment 103. To this end, the remote workspace client 149 can render the graphical user interface data generated by the remotely executed applications 118 and/or the remote desktop environments 121 and also encode user input data and send the user input data over the network 109 back to the remotely executed applications 118 and/or the remote desktop environments 121. As will be described, the remote workspace client 149 also can function to automatically transfer local files 154 from the client device 106 to the remote data store 112 so that the files can be opened by the remotely executed applications 118 and/or the remote desktop environments 121.

The client device 106 has a device storage 151 with various data, including the local files 154 and other data. The local files 154 can include word processing files, PDF files, image files, text files, video files, audio files, and/or other types of data. In some cases, the local files 154 can include clipboard data or portions of data not saved as a file.

Figure 2:
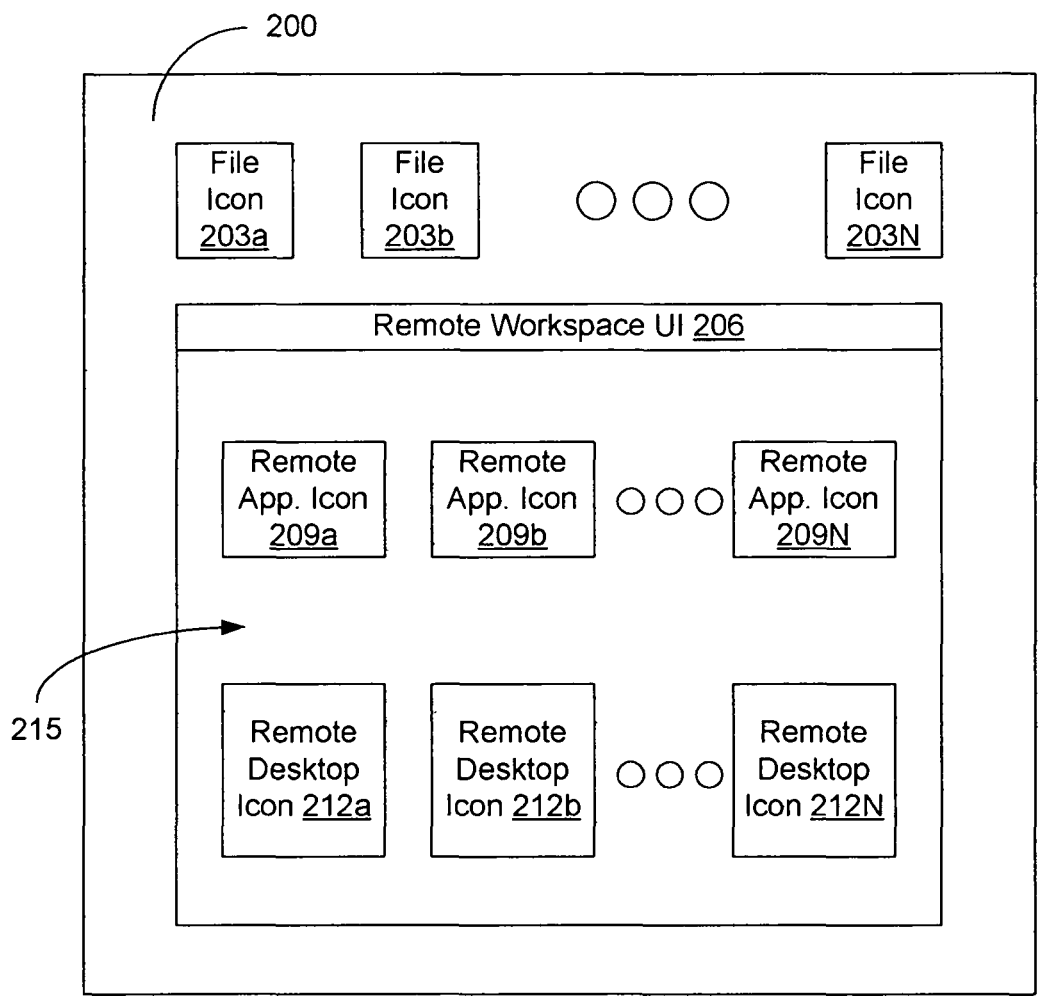
FIGS. 2-3 are examples of user interfaces generated by a client device in the networked environment of FIG. 1.

Moving on to FIG. 2, shown is an example of a user interface 200 generated by the client device 106. The user interface 200 includes a plurality of file icons 203a, 203b . . . 203N. The file icons 203 correspond to local files 154 stored in the device storage 151 or other data stores locally accessible to the client device 106, such as a network-attached storage device available over a local network. The file icons 203 can be rendered by a desktop interface of the operating system 145 or by a file browser of the client device 106. Clicking, double clicking, tapping, or other user actions relative to a file icon 203 can cause the operating system 145 to open the corresponding local file 154 using an application 148 associated to the local file 154 by way of a file association, for example.

The user interface 200 also includes a remote workspace user interface 206 rendered by the remote workspace client 149. In this example, the remote workspace user interface 206 includes a plurality of remote application icons 209a, 209b . . . 209N, corresponding to remotely executable applications 118, and a plurality of remote desktop icons 212a, 212b . . . 212N, corresponding to remote desktop environments 121. In other examples, singular remote application icons 209 or remote desktop icons 212 can be present, or remote application icons 209 can be present while remote desktop icons 212 are absent, or vice versa. Clicking, double clicking, tapping, or other user actions relative to a remote application icon 209 or a remote desktop icon 212 can cause the remote workspace client 149 to open a session with an instance of the corresponding remotely executed application 118 or remote desktop environment 121.

Performing a drag-and-drop action of a file icon 203 relative to a remote application icon 209 or a remote desktop icon 212 causes a copy of the corresponding local file 154 to be opened by the corresponding remotely executed application 118 or remote desktop environment 121. For instance, the file icon 203 can be dragged-and-dropped onto or approximately onto the remote application icon 209 or the remote desktop icon 212, thereby causing a drag-and-drop action to be performed. If a file icon 203 is dragged-and-dropped relative to a remote desktop icon 212, the remote workspace client 149 can render a listing of one or more recommended remotely executed applications 118 in the corresponding remote desktop environment 121. The user can then select a particular remotely executed application 118 from the listing.

In another example, the user can drag-and-drop a file icon 203 relative to or onto a blank region 215 of the remote workspace user interface 206. Such a drag-and-drop action can cause the remote workspace client 149 to render a listing of one or more recommended remotely executed applications 118, which can be within or independent of a remote desktop environment 121.

Although the discussion of FIG. 2 refers to icons, it is understood that other indicia can be used. For example, text can be used in lieu of an icon. Further, in one example, a user can select a blank region 215, a remote application icon 209, or a remote desktop icon 212, and then activate a "paste" function, thereby causing a particular corresponding remotely executed application 118 to open the clipboard contents, or causing a listing of recommended remotely executed applications 118 for opening the clipboard contents to be rendered. In still other examples, a voice command interface can be employed to direct the remote workspace client 149 to open a local file 154 remotely with a particular remotely executed application 118, or to allow for a selection from a set of recommended remotely executed applications 118 for opening the local file 154 remotely.

Figure 3:
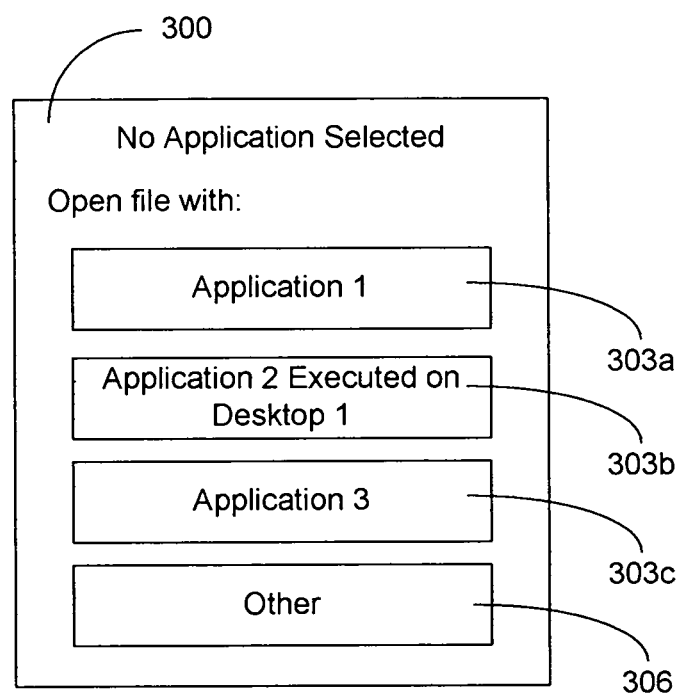

Continuing to FIG. 3, shown is an example of a recommendation user interface 300 rendered by the remote workspace client 149 on the client device 106. The recommendation user interface 300 indicates that no application was selected for opening the particular local file 154 and provides a listing of recommended applications 303a, 303b, and 303c. The applications 303 can be within a remote desktop environment 121 or can be an independent remotely executed application 118. Also, another application can be selected using the other component 306, which can include a longer list or an exhaustive list.

Figure 4:
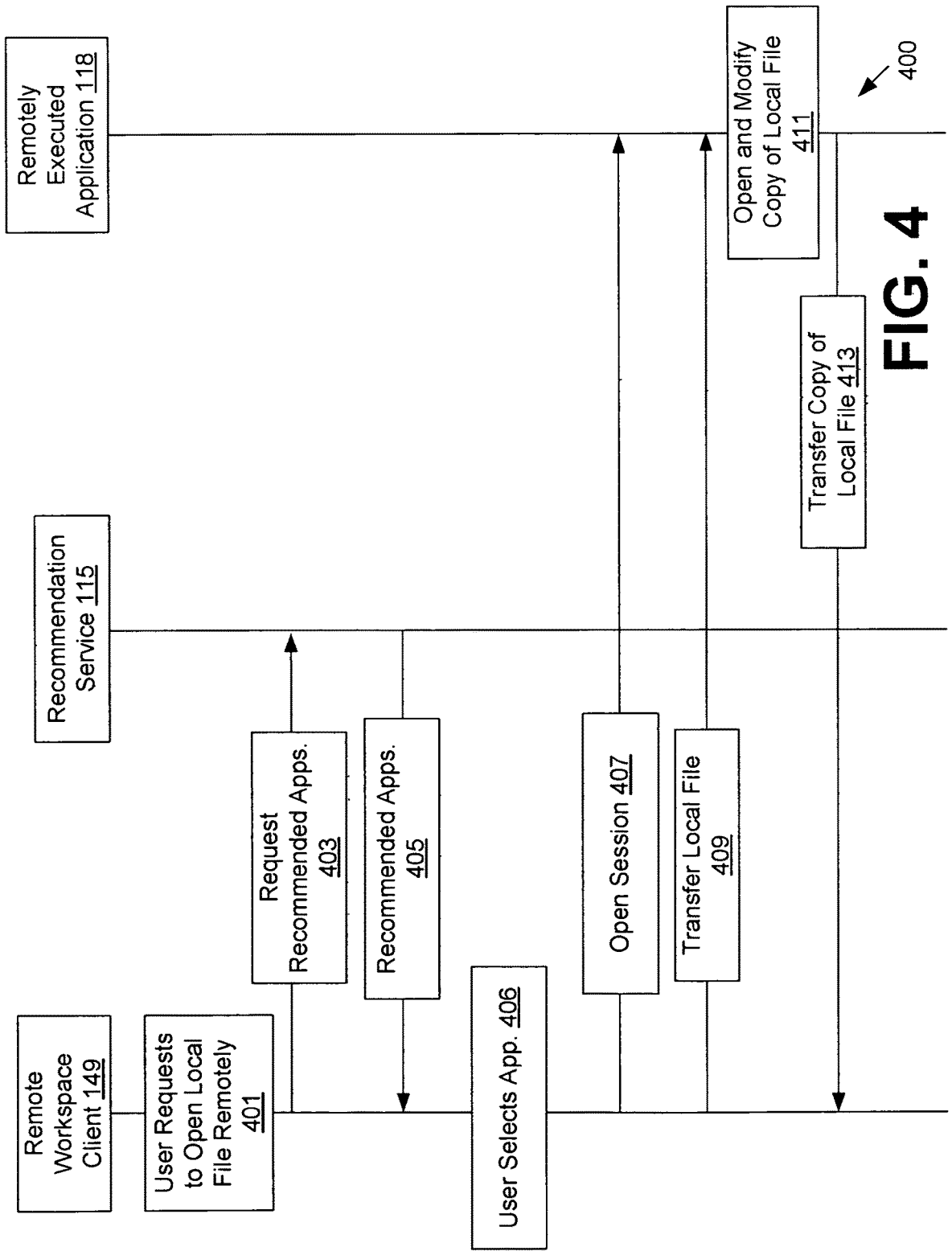
FIG. 4 is a sequence diagram illustrating example component interactions according to various examples of the present disclosure.

Turning now to FIG. 4, shown is a sequence diagram 400 illustrating one example of interaction between a remote workspace client 149, a recommendation service 115, and a remotely executed application 118. Functionality attributed to the remote workspace client 149, the recommendation service 115, and the remotely executed application 118 can be implemented in fewer processes or applications or in additional processes or applications. The separation or segmentation of functionality as discussed herein is presented for illustrative purposes only.

Beginning with step 401, a user request is received by the remote workspace client 149 to open a local file 154 remotely. At step 403, the remote workspace client 149 requests a list of recommended remotely executed applications 118 from the recommendation service 115. The request can specify the file name, file type, and/or other information about the local file 154. If a user specifies a remote desktop environment 121 to open the local file 154, the request can identify the remote desktop environment 121. It is noted that in some cases the recommendation service 115 can be implemented locally on the client device 106.

The recommendation service 115 returns a list of recommended remotely executed applications 118 to the remote workspace client 149 at step 405. At step 406, the user at the client device 106 selects a particular remotely executed application 118 from the list. At step 407, the remote workspace client 149 opens a session with the particular remotely executed application 118 over the network 109. An authentication procedure can be performed, and the remotely executed application 118 or other systems can verify that the user at the client device 106 has access to the remotely executed application 118. Security credentials stored on the client device 106 or provided by the user can be provided for authentication. After the session commences, the remotely executed application 118 can send data encoding a graphical user interface to the remote workspace client 149 for rendering, and the remote workspace client 149 can send data encoding user input data to the remotely executed application 118.

The remote workspace client 149 automatically transfers the local file 154 to a remote data store 112 accessible to the remotely executed application 118 at step 409. The operation of the remotely executed application 118 can be paused while waiting for the transfer to complete, or the remotely executed application 118 can begin processing the data as it is received. In some cases, a user interface dialog can show to the user the file transfer process.

At step 411, the remotely executed application 118 opens and allows for modification of the copy of the local file 154. After the copy is modified, the client file copy 124 is transferred back to the client device 106. Subsequently, the remote workspace client 149 can replace the existing local file 154 with the modified copy, save the modified copy as a new local file 154, or prompt the user for how to proceed.

Figure 5:
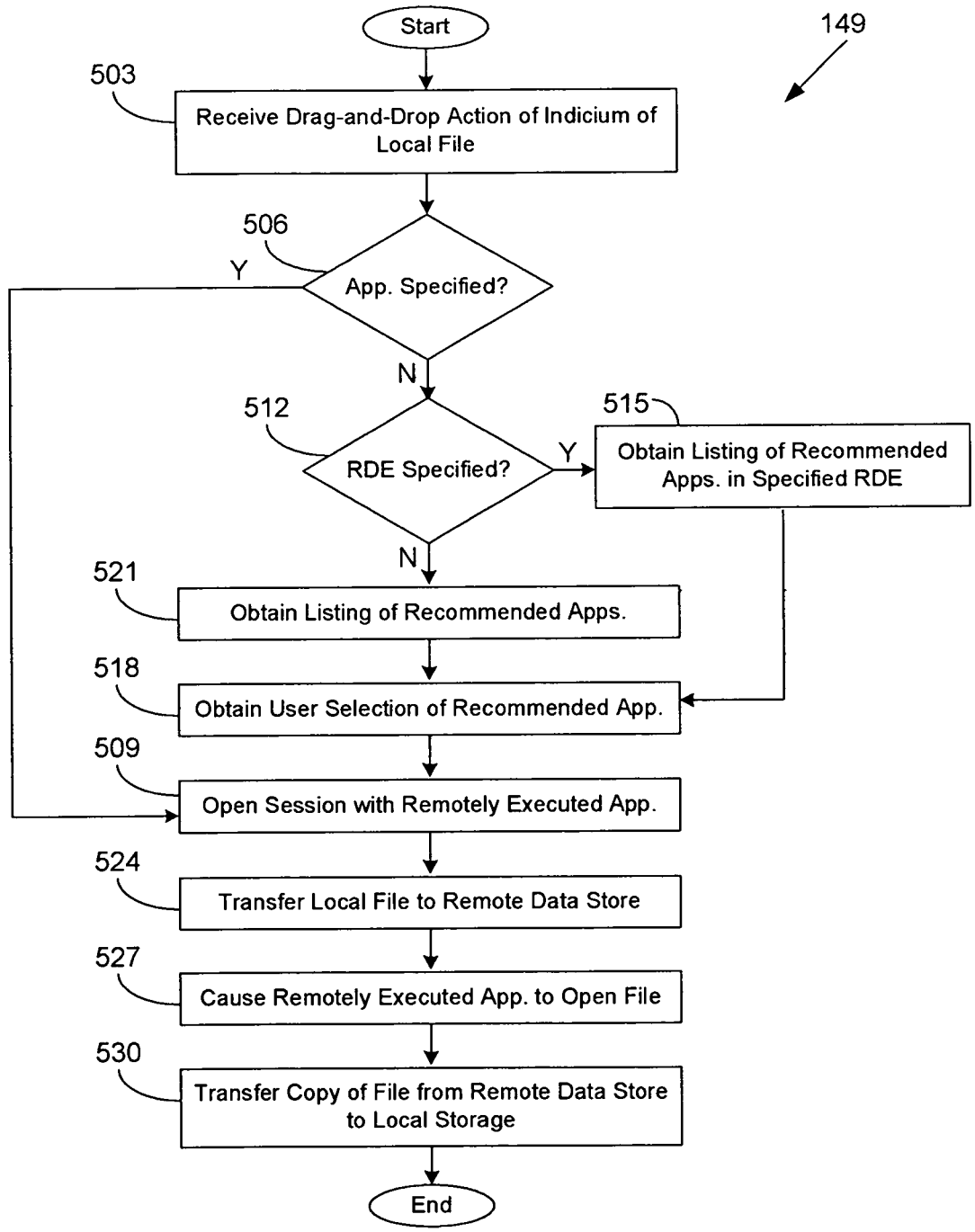
FIGS. 5-7 are flowcharts illustrating examples of functionality according to various examples of the present disclosure.

Turning now to FIG. 5, shown is a flowchart that provides one example of the operation of the remote workspace client 149. Functionality attributed to the remote workspace client 149 can be implemented in a single process or application or in multiple processes or applications. The separation or segmentation of functionality as discussed herein is presented for illustrative purposes only.

Beginning with step 503, the remote workspace client 149 receives a drag-and-drop action by a user of an indicium of a local file 154 relative to an indicium of a remotely executed application 118, an indicium of a remote desktop environment 121, or an indicium of a blank region 215 in a user interface 206 of the remote workspace client 149. In some cases, the drag-and-drop action can be relative to an indicium of the remote workspace client 149 rather than merely a blank region 215.

At step 506, the remote workspace client 149 determines whether a particular remotely executed application 118 is specified by the drag-and-drop action. If so, the remote workspace client 149 proceeds from step 506 to step 509. Otherwise, the remote workspace client 149 proceeds from step 506 to step 512. At step 512, the remote workspace client 149 determines whether a particular remote desktop environment 121 is specified by the drag-and-drop action. In some cases, a remote desktop environment 121 can be automatically determined from a plurality of remote desktop environments 121 based on history, associations, or context. If a remote desktop environment 121 is identified or specified, the remote workspace client 149 obtains a listing of recommended remotely executed applications 118 in the specified remote desktop environment 121 from the recommendation service 115 at step 515. The remote workspace client 149 then proceeds to step 518.

If no particular remote desktop environment 121 is specified by the drag-and-drop action, the remote workspace client 149 instead proceeds from step 512 to step 521 and obtains a listing of recommended remotely executed applications 118 from the recommendation service 115 irrespective of a particular remote desktop environment 121. The remote workspace client 149 then proceeds to step 518 and obtains a user selection of a recommended remotely executed application 118 from the listing. The remote workspace client 149 moves to step 509.

At this point, a remotely executed application 118 has been identified, either through the drag-and-drop action, or by user selection through a recommendation list. In some cases, the remotely executed application 118 can be automatically identified based on a file type associated with the local file 154. At step 509, the remote workspace client 149 opens a session with the remotely executed application 118. In doing so, the remote workspace client 149 can specify security credentials or previously negotiated tokens for authentication. At step 524, the remote workspace client 149 automatically transfers the local file 154 to the remote data store 112 as a client file copy 124.

At step 527, the remote workspace client 149 causes the remotely executed application 118 to open the client file copy 124. In this regard, the remote workspace client 149 can launch the remotely executed application 118 with a locator of the client file copy 124 being passed as a parameter, indicate the client file copy 124 to be opened by way of an application programming interface (API), or programmatically manipulate a user interface of the remotely executed application 118 to enter the locator of the client file copy 124 and cause the client file copy 124 to be opened.

At step 530, the remote workspace client 149 causes the client file copy 124 that is modified to be automatically transferred back to local storage of the client device 106. This transfer can be of a push or pull nature. That is to say, the remote workspace client 149 can pull the client file copy 124 from the remote data store 112 or the remotely executed application 118 or other logic executed in the computing environment 103 can push the client file copy 124 from the remote data store 112 to the client device 106. In one example, the remote workspace client 149 determines whether the client file copy 124 is modified, and causes the client file copy 124 to be automatically transferred to the client device 106 if modified.

Figure 6:
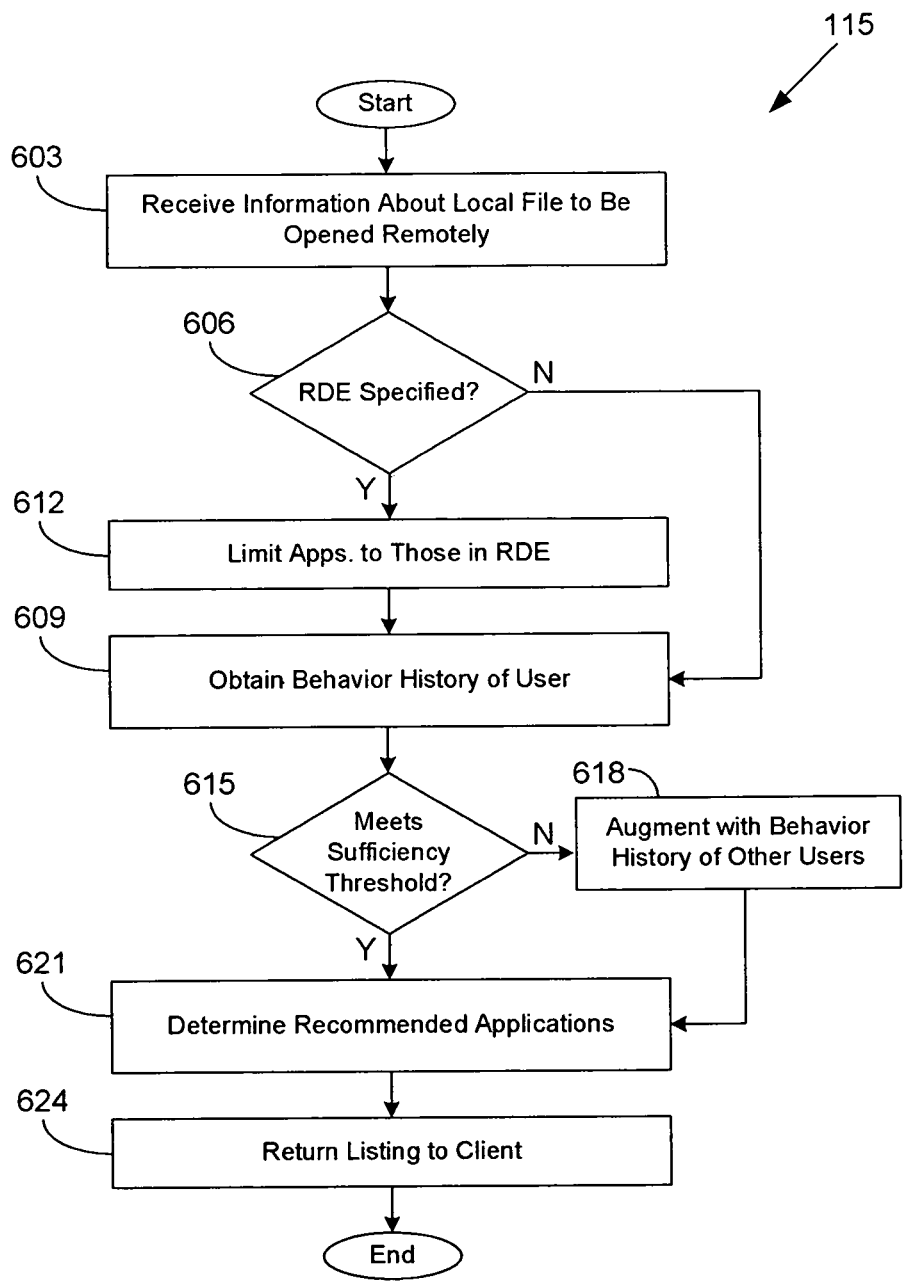

Turning now to FIG. 6, shown is a flowchart that provides one example of the operation of the recommendation service 115. Functionality attributed to the recommendation service 115 can be implemented in a single process or application or in multiple processes or applications. The separation or segmentation of functionality as discussed herein is presented for illustrative purposes only.

Beginning with step 603, the recommendation service 115 receives information about a local file 154 to be opened remotely. This can include file type information 130, user information, client device capability information, and so on. At step 606, the recommendation service 115 determines whether a particular remote desktop environment 121 is specified. If not, the recommendation service 115 proceeds to step 609. If a particular remote desktop environment 121 is specified, the recommendation service 115 moves from step 606 to step 612 and limits the choice of remotely executed applications 118 to those which are executable in the remote desktop environment 121. The recommendation service 115 then proceeds to step 609.

At step 609, the recommendation service 115 obtains behavior history of the user from the user behavior data 127. At step 615, the recommendation service 115 determines whether the behavior history of the user meets a sufficiency threshold. For example, the user can be new to the organization or otherwise not have a long history of opening local files 154 in the remote workspace client 149. Perhaps the user has never opened the local file 154 or has opened similar local files 154 having a same file type only twice, while a sufficiency threshold can specify, for example, a minimum of opening the same local file 154 once or opening similar local files 154 at least three times.

If the behavior history of the user does not meet the sufficiency threshold, the recommendation service 115 moves to step 618 and augments the behavior history with behavior history of other users. The other users can in some examples be filtered to be users similar to the given user in some respect, for example, having the same or similar role in the organization as the user. The recommendation service 115 proceeds to step 621. If the behavior history of the user does meet the sufficiency threshold, the recommendation service 115 proceeds from step 615 directly to step 621.

At step 621, the recommendation service 115 determines a set of recommended remotely executed applications 118. For example, the recommendation service 115 can weight instances of usage of remotely executed applications 118 for similar local files 154 such that more recent use is weighted more heavily than less recent use. The weights of the instances of usage of the respective remotely executed applications 118 can be added together, and a threshold can be used to limit the remotely executed applications 118 in the set. For example, a subset of the remotely executed applications accessible to the user can be determined as having a greatest sum of weights for the corresponding instances. At step 624, the recommendation service 115 returns a listing of the set of recommended remotely executed applications 118 to the remote workspace client 149.

Figure 7:
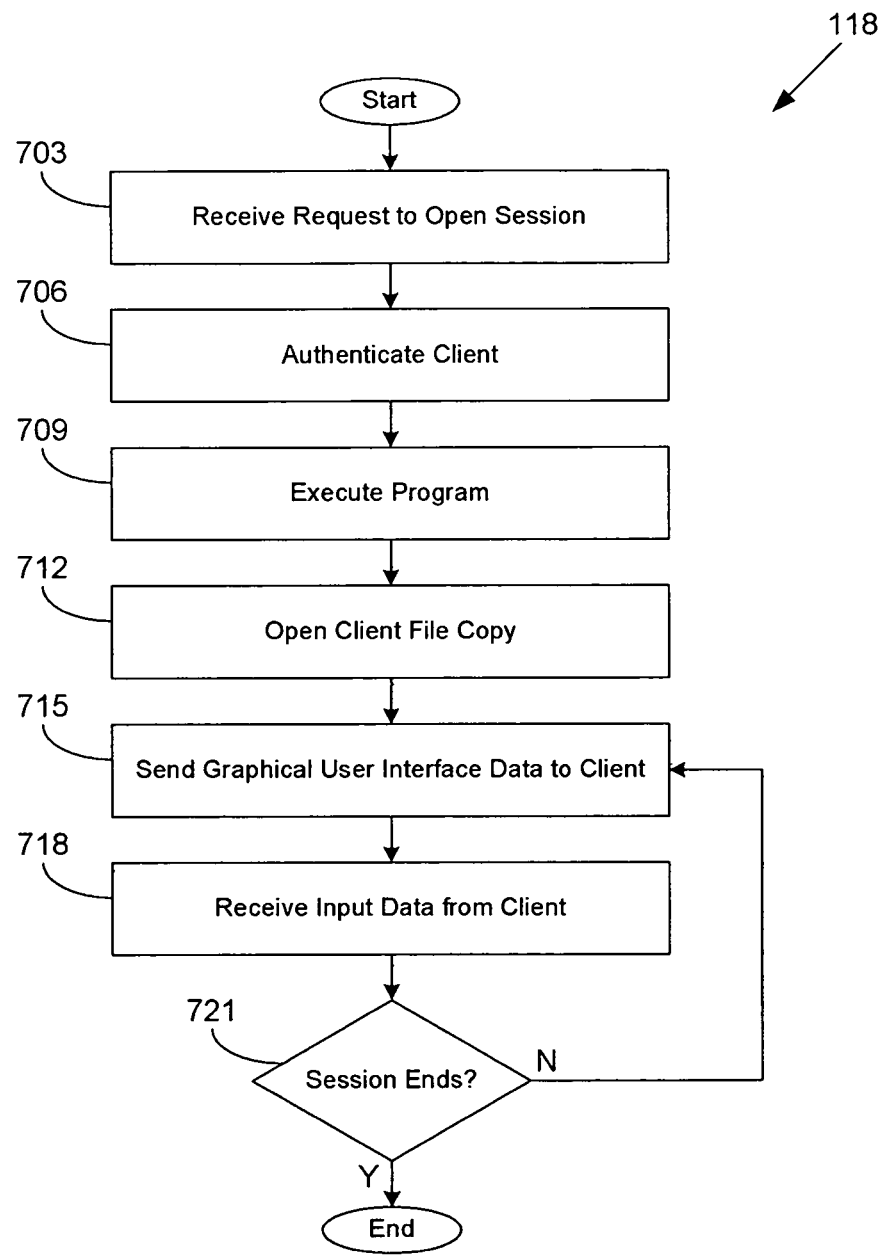

Referring next to FIG. 7, shown is a flowchart that provides one example of the operation of the remotely executed application 118 and associated wrappers or surrounding functionality. Functionality attributed to the remotely executed application 118 can be implemented in a single process or application or in multiple processes or applications. The separation or segmentation of functionality as discussed herein is presented for illustrative purposes only.

Beginning with step 703, the remotely executed application 118 receives a request to open a session. This can be initiated automatically after a user of a client device 106 performs a drag-and-drop action relative to a remote workspace user interface 206. At step 706, the remotely executed application 118 authenticates the remote workspace client 149, which can present a token or other security credential. At step 706, the remotely executed application 118 executes the program or other functionality provided by the remotely executed application 118.

At step 712, the remotely executed application 118 opens a client file copy 124 corresponding to a local file 154 from a client device 106 that has been transferred to the remote data store 112. At step 715, the remotely executed application 118 sends graphical user interface data to the remote workspace client 149 for rendering. At step 718, the remotely executed application 118 receives user input data from the remote workspace client 149. At step 721, the remotely executed application 118 determines whether the session has ended. For example, a user can explicitly exit the session, or the session can time out due to idleness or lack of network connectivity. If the session has not ended, the remotely executed application 118 can return to step 715 and continue sending the graphical user interface data to the remote workspace client 149.

The flowcharts of FIGS. 5-7 and the sequence diagram of FIG. 4 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 5-7 and the sequence diagram of FIG. 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the computing environment 103, the client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The remote workspace client 149, the recommendation service 115, the remotely executed applications 118, the remote desktop environments 121, and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, or flash memory. Further, any logic or component described herein can be implemented and structured in a variety of ways. One or more components described can be implemented as modules or components of a single application. Further, one or more components described herein can be executed in one computing device or by using multiple computing devices.

Embodiments of the present disclosure can be described with reference to the following clauses:

Clause 1. A system for opening a local file remotely, comprising: at least one computing device comprising a processor and a memory; and machine readable instructions stored in the memory that, when executed by the processor, cause the at least one computing device to at least: receive a user request to open the local file of a client device remotely; identify a remotely executed application to open the local file; cause the client device to automatically transfer the local file to a remote data store accessible to the remotely executed application; and cause the remotely executed application to open a copy of the local file from the remote data store.

Clause 2. The system of clause 1, wherein the user request specifies the remotely executed application.

Clause 3. The system of clause 1, wherein the machine readable instructions when executed by the processor cause the at least one computing device to at least: determine a file type associated with the local file; and wherein identifying the remotely executed application further comprises automatically determining the remotely executed application from a plurality of remotely executed applications according to the file type.

Clause 4. The system of clause 1, wherein the machine readable instructions when executed by the processor cause the at least one computing device to at least: automatically determine a remote desktop environment from a plurality of remote desktop environments; and wherein the remotely executed application is executed in the remote desktop environment.

Clause 5. The system of clause 1, wherein the machine readable instructions when executed by the processor cause the at least one computing device to at least: determine that the copy of the local file in the remote data store has been modified by the remotely executed application; and cause the copy of the local file that has been modified to be automatically transferred to the client device.

Clause 6. The system of clause 5, wherein upon transfer to the client device the copy of the local file that has been modified replaces the local file on the client device.

Clause 7. The system of clause 1, wherein data encoding a graphical user interface of the remotely executed application is sent to the client device over a network, and input data relative to the graphical user interface is sent by the client device to the remotely executed application over the network.

Clause 8. A method for opening a local file remotely, comprising: receiving a user request to open the local file of a client device remotely; identifying a remote desktop environment to open the local file; causing the client device to automatically transfer the local file to a remote data store accessible to the remote desktop environment; and causing a remotely executed application in the remote desktop environment to open a copy of the local file from the remote data store.

Clause 9. The method of clause 8, further comprising: determining that the copy of the local file in the remote data store has been modified; and causing the client device to automatically obtain the copy of the local file that has been modified from the remote data store.

Clause 10. The method of clause 9, further comprising causing the client device to replace the local file with the copy of the local file that has been modified.

Clause 11. The method of clause 8, further comprising causing a progress indicator to be rendered by the client device, the progress indicator indicating a transfer progress of the local file to the remote data store.

Clause 12. The method of clause 8, wherein identifying the remote desktop environment further comprises selecting the remote desktop environment from a plurality of remote desktop environments accessible by a user of the client device.

Clause 13. The method of clause 8, wherein identifying the remote desktop environment further comprises selecting the remote desktop environment from a set including at least one remote desktop environment and at least one remotely executed application independent of the at least one remote desktop environment, wherein each remote desktop environment and remotely executed application in the set is accessible by a user of the client device.

Clause 14. A non-transitory computer readable medium comprising machine readable instructions that, when executed by a processor of a client device, cause the client device to at least: receive a user request to open a local file from the client device in a remotely executed application; automatically transfer the local file to a remote data store accessible to the remotely executed application; and automatically cause the remotely executed application to open a copy of the local file from the remote data store.

Clause 15. The non-transitory computer readable medium of clause 14, wherein data encoding a graphical user interface of the remotely executed application is sent to the client device over a network, and input data relative to the graphical user interface is sent by the client device to the remotely executed application over the network.

Clause 16. The non-transitory computer readable medium of clause 14, wherein the user request specifies the remotely executed application.

Clause 17. The non-transitory computer readable medium of clause 14, further comprising machine readable instructions that cause the client device to at least automatically determine the remotely executed application based at least in part on a file type associated with the local file.

Clause 18. The non-transitory computer readable medium of clause 14, further comprising machine readable instructions that cause the client device to at least recommend a plurality of remotely executed applications capable of opening the local file.

Clause 19. The non-transitory computer readable medium of clause 18, further comprising machine readable instructions that cause the client device to at least receive a user selection of one of the remotely executed applications through a user interface.

Clause 20. The non-transitory computer readable medium of clause 14, further comprising machine readable instructions that cause the client device to at least automatically transfer a modified copy of the local file from the remote data store to the client device.

Clause 21. A system for opening a local file remotely, comprising: a client device comprising a processor and a memory; and machine readable instructions stored in the memory that, when executed by the processor, cause the client device to at least: render a user interface including a first indicium corresponding to the local file of the client device and a second indicium corresponding to a remotely executed application; detect a drag-and-drop action of the first indicium relative to the second indicium; and responsive to the drag-and-drop action, cause the remotely executed application to open a copy of the local file.

Clause 22. The system of clause 21, wherein the remotely executed application is independent of a remote desktop environment.

Clause 23. The system of clause 21, wherein the machine readable instructions when executed by the processor cause the at least one computing device to at least, further responsive to the drag-and-drop action, open a session to communicate with the remotely executed application, wherein during the session, data encoding a graphical user interface of the remotely executed application is sent to the client device over a network, and input data relative to the graphical user interface is sent by the client device to the remotely executed application over the network.

Clause 24. The system of clause 21, wherein the machine readable instructions when executed by the processor cause the at least one computing device to at least, further responsive to the drag-and-drop action, automatically transfer the copy of the local file from the client device to a remote data store accessible to the remotely executed application.

Clause 25. The system of clause 21, wherein the machine readable instructions when executed by the processor cause the at least one computing device to at least: determine that the copy of the local file has been modified by the remotely executed application; and automatically transfer the copy of the local file to the client device.

Clause 26. The system of clause 21, wherein the first indicium and the second indicium are graphical icons.

Clause 27. A method for opening a local file remotely, comprising: rendering a user interface including a first indicium corresponding to the local file of a client device and a second indicium corresponding to a remote desktop environment; detecting a drag-and-drop action of the first indicium relative to the second indicium; and responsive to the drag-and-drop action, causing a remotely executed application in the remote desktop environment to open a copy of the local file.

Clause 28. The method of clause 27, wherein the first indicium and the second indicium are graphical icons.

Clause 29. The method of clause 27, further comprising responsive to the drag-and-drop action, opening a session to communicate with the remote desktop environment, wherein during the session, data encoding a graphical user interface of the remote desktop environment is sent to the client device over a network, and input data relative to the graphical user interface is sent by the client device to the remote desktop environment over the network.

Clause 30. The method of clause 27, further comprising: responsive to the drag-and-drop action, updating the user interface to list one or more remotely executed applications in the remote desktop environment to open the local file; and receiving a user selection of the remotely executed application from the one or more remotely executed applications that are listed in the user interface.

Clause 31. The method of clause 27, further responsive to the drag-and-drop action, automatically transferring the copy of the local file from the client device to a remote data store accessible to the remote desktop environment.

Clause 32. The method of clause 27, further comprising: determining that the copy of the local file has been modified; and automatically transferring the copy of the local file to the client device.

Clause 33. A non-transitory computer readable medium comprising machine readable instructions that, when executed by a processor of a client device, cause the client device to at least: render a user interface including a region and an indicium corresponding to a local file of the client device; detect a drag-and-drop action of the indicium relative to the region; responsive to the drag-and-drop action, update the user interface to list one or more remotely executed applications to open the local file; receive a user selection of a particular remotely executed application from the one or more remotely executed applications; and cause the particular remotely executed application to open a copy of the local file.

Clause 34. The non-transitory computer readable medium of clause 33, further comprising machine readable instructions that further cause the client device to at least determine the one or more remotely executed applications based at least in part on a file type of the local file.

Clause 35. The non-transitory computer readable medium of clause 33, further comprising machine readable instructions that further cause the client device to at least, further responsive to the drag-and-drop action, open a session to communicate with the particular remotely executed application, wherein during the session, data encoding a graphical user interface of the remotely executed application is sent to the client device over a network, and input data relative to the graphical user interface is sent by the client device to the remotely executed application over the network.

Clause 36. The non-transitory computer readable medium of clause 33, further comprising machine readable instructions that further cause the client device to at least, responsive to the drag-and-drop action, automatically transfer the copy of the local file from the client device to a remote data store accessible to the particular remotely executed application.

Clause 37. The non-transitory computer readable medium of clause 33, further comprising machine readable instructions that further cause the client device to at least: determine that the copy of the local file has been modified; and automatically transfer the copy of the local file to the client device.

Clause 38. The non-transitory computer readable medium of clause 33, wherein the particular remotely executed application is in a remote desktop environment, and further comprising machine readable instructions that further cause the client device to at least open a session with the remote desktop environment responsive to the user selection.

Clause 39. The non-transitory computer readable medium of clause 33, wherein the region is a blank area within the user interface.

Clause 40. The non-transitory computer readable medium of clause 33, wherein the indicium is a graphical icon.

Clause 41. A system for recommending remotely executed applications to open a local file remotely, comprising: at least one computing device comprising a processor and a memory; and machine readable instructions stored in the memory that, when executed by the processor, cause the at least one computing device to at least: receive an indication that a user desires to open the local file of a client device remotely; identify at least one remotely executed application to open the local file remotely; cause a user interface to be rendered by the client device that facilitates selection from among the at least one remotely executed application; receive a user selection of a particular remotely executed application generated through the user interface; and cause the particular remotely executed application to open the local file remotely.

Clause 42. The system of clause 41, wherein the indication that the user desires to open the local file of the client device remotely corresponds to a drag-and-drop action of a first icon corresponding to the local file onto a second icon corresponding to a remote desktop environment or onto a blank region of another user interface associated with remote application execution.

Clause 43. The system of clause 41, wherein the machine readable instructions when executed by the processor cause the at least one computing device to at least: cause the client device to automatically transfer a copy of the local file to a remote data store accessible to the particular remotely executed application; determine that the particular remotely executed application has modified the copy of the local file; and cause the copy of the local file that has been modified to be transferred to the client device.

Clause 44. The system of clause 41, wherein the at least one remotely executed application is identified based at least in part on a file extension of the local file.

Clause 45. The system of clause 41, wherein the indication further indicates that the user desires to open the local file using a particular remote desktop environment, and the at least one remotely executed application is identified from a plurality of remotely executed applications available in the particular remote desktop environment.

Clause 46. The system of clause 41, wherein the at least one remotely executed application is identified based at least in part on data indicating that the user has previously used the at least one remotely executed application to open the local file.

Clause 47. The system of clause 41, wherein the at least one remotely executed application is identified based at least in part on data indicating that the user has previously used the at least one remotely executed application to open files having a same file type as the local file.

Clause 48. The system of clause 41, wherein the at least one remotely executed application is identified based at least in part on data indicating that a plurality of other users have used the at least one remotely executed application to open the local file.

Clause 49. The system of clause 41, wherein the at least one remotely executed application is identified based at least in part on data indicating that a plurality of other users have used the at least one remotely executed application to open files having a same file type as the local file.

Clause 50. A method for recommending remotely executed applications to open a local file remotely, comprising: receiving an indication that a user desires to open the local file of a client device remotely; identifying at least one remotely executed application to open the local file remotely; causing a user interface to be rendered by the client device that facilitates selection from among the at least one remotely executed application; receiving a user selection of a particular remotely executed application generated through the user interface; and causing the particular remotely executed application to open the local file remotely.

Clause 51. The method of clause 50, further comprising: determining a plurality of instances in which a plurality of remotely executed applications were used by the user or a plurality of other users to open the local file; assigning a respective weight to each of the plurality of instances according to most recent use; and determining a subset of the plurality of remotely executed applications having a greatest sum of weights for corresponding instances.

Clause 52. The method of clause 50, further comprising receiving the indication by detecting a drag-and-drop action for an icon of the local file through another user interface.

Clause 53. The method of clause 50, further comprising causing the client device to automatically transfer a copy of the local file to a remote data store accessible to the particular remotely executed application.

Clause 54. The method of clause 50, wherein identifying the at least one remotely executed application further comprises identifying the at least one remotely executed application based at least in part on a file type associated with the local file.

Clause 55. The method of clause 50, wherein the local file corresponds to a clipboard content of the client device.

Clause 56. A non-transitory computer readable medium comprising machine readable instructions that, when executed by a processor of a client device, cause the client device to at least: receive an indication that a user desires to open a local file of the client device remotely; recommend at least one remotely executed application to open the local file remotely; receive a user selection of a particular remotely executed application from a listing of the recommended at least one remotely executed application; and cause the particular remotely executed application to open the local file remotely.

Clause 57. The non-transitory computer readable medium of clause 56, wherein the indication corresponds to a drag-and-drop action of a first icon corresponding to the local file onto a second icon corresponding to a particular remote desktop environment, and the at least one remotely executed application is determined to be available in the particular remote desktop environment.

Clause 58. The non-transitory computer readable medium of clause 56, wherein the at least one remotely executed application is recommended based at least in part on a behavior history of the user with respect to opening the local file or files similar to the local file.

Clause 59. The non-transitory computer readable medium of clause 56, wherein the at least one remotely executed application is recommended based at least in part on a behavior history of a plurality of other users with respect to opening the local file or files similar to the local file.

Clause 60. The non-transitory computer readable medium of clause 59, wherein the behavior history of the plurality of other users is used in in response to determining that a behavior history of the user with respect to opening the local file or the files similar to the local file does not meet a sufficiency threshold.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for recommending remotely executed applications to open a local file remotely, comprising:
   at least one computing device comprising a processor and a memory; and
   machine readable instructions stored in the memory that, when executed by the processor, cause the at least one computing device to at least:
      receive an indication that a user physically operating a client device desires to open the local file of the client device remotely from the client device, wherein the indication that the user desires to open the local file of the client device remotely corresponds to a drag-and-drop action of a first icon corresponding to the local file onto a second icon corresponding to a remote desktop environment or onto a blank region of another user interface associated with remote application execution;
      after receiving the indication, cause a user interface to be rendered by the client device that facilitates selection from among a plurality of remote desktop environments;
      identify at least one remotely executed application of a selected remote desktop environment to open the local file remotely, wherein the at least one remotely executed application is identified based at least in part on data indicating that a plurality of other users have used the at least one remotely executed application to open the local file or a file of a same type as the local file;
      cause the user interface to be rendered by the client device that facilitates selection from among the at least one remotely executed application, wherein the user interface presents a list of remotely executed applications that are executable in the selected remote desktop environment, wherein the list of remotely executed applications are weighted based on a recency of use in opening the local file or a file of a same type as the local file, wherein an individual remotely executed application in the list has a weight greater than a sufficiency threshold value;
      receive a user selection of a particular remotely executed application generated through the user interface; and
      cause the particular remotely executed application to open the local file remotely.

2. The system of claim 1, wherein the machine readable instructions when executed by the processor cause the at least one computing device to at least:
   cause the client device to automatically transfer a copy of the local file to a remote data store accessible to the particular remotely executed application;
   determine that the particular remotely executed application has modified the copy of the local file; and
   cause the copy of the local file that has been modified to be transferred to the client device.

3. The system of claim 1, wherein the at least one remotely executed application is identified based at least in part on a file extension of the local file.

4. The system of claim 1, wherein the indication further indicates that the user desires to open the local file using a particular remote desktop environment, and the at least one remotely executed application is identified from a plurality of remotely executed applications available in the particular remote desktop environment.

5. The system of claim 1, wherein the at least one remotely executed application is identified based at least in part on data indicating that the user has previously used the at least one remotely executed application to open the local file.

6. The system of claim 1, wherein the at least one remotely executed application is identified based at least in part on data indicating that the user has previously used the at least one remotely executed application to open files having a same file type as the local file.

7. A method for recommending remotely executed applications to open a local file remotely, comprising:
   receiving an indication that a user physically operating a client device desires to open the local file of the client device remotely from the client device by detecting a drag-and-drop action for a first icon of the local file onto a second icon corresponding to a remote desktop environment or onto a blank region of another user interface associated with remote application execution;
   after receiving the indication, cause a user interface to be rendered by the client device that facilitates selection from among a plurality of remote desktop environments;
   identifying at least one remotely executed application of a selected remote desktop environment to open the local file remotely, wherein the at least one remotely executed application is identified based at least in part on data indicating that a plurality of other users have used the at least one remotely executed application to open the local file or a file of a same type as the local file;
   causing the user interface to be rendered by the client device that facilitates selection from among the at least one remotely executed application, wherein the user interface presents a list of remotely executed applications that are executable in the selected remote desktop environment, wherein the list of remotely executed applications are weighted based on a recency of use in opening the local file or a file of a same type as the local file, wherein an individual remotely executed application in the list has a weight greater than a sufficiency threshold value;

receiving a user selection of a particular remotely executed application generated through the user interface; and causing the particular remotely executed application to open the local file remotely.

8. The method of claim 7, further comprising:

determining a plurality of instances in which a plurality of remotely executed applications were used by the user or a plurality of other users to open the local file;

assigning a respective weight to each of the plurality of instances according to most recent use; and determining a subset of the plurality of remotely executed applications having a greatest sum of weights for corresponding instances.

9. The method of claim 7, further comprising causing the client device to automatically transfer a copy of the local file to a remote data store accessible to the particular remotely executed application.

10. The method of claim 7, wherein the local file corresponds to a clipboard content of the client device.

11. A non-transitory computer readable medium comprising machine readable instructions that, when executed by a processor of a client device, cause the client device to at least:

receive an indication that a user physically operating a client device desires to open a local file of the client device remotely from the client device, wherein the indication corresponds to a drag-and-drop action of a first icon corresponding to the local file onto a second icon corresponding to a remote desktop environment or onto a blank region of another user interface associated with remote application execution;

after receiving the indication, cause a user interface to be rendered by the client device that facilitates selection from among a plurality of remote desktop environments;

identify at least one remotely executed application of a selected remote desktop environment to open the local file remotely, wherein the at least one remotely executed application is identified based at least in part on data indicating that a plurality of other users have used the at least one remotely executed application to open the local file or a file of a same type as the local file;

cause the user interface to be rendered by the client device that facilitates selection from among the at least one remotely executed application, wherein the user interface presents a list of remotely executed applications that are executable in the selected remote desktop environment, wherein the list of remotely executed applications are weighted based on a recency of use in opening the local file or a file of a same type as the local file, wherein an individual remotely executed application in the list has a weight greater than a sufficiency threshold value;

receive a user selection of a particular remotely executed application generated through the user interface; and cause the particular remotely executed application to open the local file remotely.

12. The non-transitory computer readable medium of claim 11, wherein the at least one remotely executed application is recommended based at least in part on a behavior history of the user with respect to opening the local file or files similar to the local file.

13. The non-transitory computer readable medium of claim 11, wherein the at least one remotely executed application is recommended based at least in part on a behavior history of a plurality of other users with respect to opening the local file or files similar to the local file.

14. The non-transitory computer readable medium of claim 13, wherein the behavior history of the plurality of other users is used in in response to determining that a behavior history of the user with respect to opening the local file or the files similar to the local file does not meet a sufficiency threshold.

15. The system of claim 2, wherein the transferring of the copy of the local file to the remote data store and the transferring of the copy of the local file that has been modified to the client device are background processes performed on the client device.

16. The method of claim 9, wherein the transferring of the copy of the local file to the remote data store is a background process performed on the client device.

17. The non-transitory computer readable medium of claim 11, wherein the machine readable instructions further cause the client device to cause the client device to automatically transfer a copy of the local file to a remote data store accessible to the particular remotely executed application, wherein the transferring of the copy of the local file to the remote data store is a background process performed on the client device.

* * * * *